United States Patent [19]

Kato

[11] 4,340,919

[45] Jul. 20, 1982

[54] HEAD ADJUSTMENT MECHANISM

[75] Inventor: Toshikazu Kato, Hachioji, Japan

[73] Assignee: Olympus Optical Co., Ltd., Tokyo, Japan

[21] Appl. No.: 126,201

[22] Filed: Mar. 3, 1980

[30] Foreign Application Priority Data

Mar. 20, 1979 [JP] Japan .................................. 54-32946

[51] Int. Cl.³ .......................... G11B 21/24; G11B 5/56
[52] U.S. Cl. ................................................. 360/109
[58] Field of Search ................................. 360/109, 104

[56] References Cited

U.S. PATENT DOCUMENTS

| | | | |
|---|---|---|---|
| 2,859,084 | 11/1958 | Raddin | 360/109 |
| 2,912,519 | 11/1959 | Simmons | 360/109 |
| 3,047,866 | 7/1962 | Stover | 360/109 |
| 3,196,215 | 7/1965 | Casey et al. | 360/104 |
| 3,936,882 | 2/1976 | Lane | 360/109 |
| 3,939,495 | 2/1976 | Nagai | 360/109 |
| 3,978,522 | 8/1976 | Rothlisberger et al. | 360/109 |
| 4,158,868 | 6/1979 | Jenkins | 360/109 |

FOREIGN PATENT DOCUMENTS 970166 9/1964 United Kingdom ................ 360/109

OTHER PUBLICATIONS

IBM Tech. Disc. Bull., I. Pejcha, Head Adjustment Tool, vol. 12, No. 3, Aug. 1969, p. 410.
IBM Tech. Disc. Bull., R. R. Rynders, Adjustable Head Mount, vol. 22, No. 9, Feb. 1980, pp. 3961-3962.

*Primary Examiner*—Alfred H. Eddleman
*Attorney, Agent, or Firm*—Frishauf, Holtz, Goodman and Woodward

[57] ABSTRACT

A head adjustment mechanism comprises an adjustment screw having two male threaded sections cut in the same direction but at different pitches. The adjustment screw has an upper end portion in screw engagement with the upper portion of the head mount and a lower end portion put in screw engagement with the base member. Thus, with one rotation of the adjustment screw the head supported by the upper portion of the head mount is vertically displaced to an extend corresponding to the difference of the pitches of the two thread sections, so that fine adjustment of the head can be obtained.

5 Claims, 6 Drawing Figures

HEAD ADJUSTMENT MECHANISM

BACKGROUND OF THE INVENTION

This invention relates to a head adjustment mechanism for magnetic tape recorders.

In magnetic tape recorder, the magnetic tape must be in close contact with the head gap face and in a correct position relative thereto during recording and playback. This means that there must not be any gap deviation, gap angle deviation or inclination of the head relative to the progress of the tape. Usually, for adjustments with respect to such deviations, a head mount is supported via compression coil springs, and an adjustment screw is provided for adjustment. In such adjustment of the head with an adjustment screw, the precision of fine adjustment depends upon the pitch of the screw. However, the machining in the manufacture of such adjustment screws imposes limitations upon the pitch of the screw, and it is difficult to produce a screw with a pitch less than 0.2 mm. With the prior art head adjustment mechanism, for instance one using an adjustment screw of the least pitch, namely 0.2 mm, one rotation of the screw causes a vertical displacement of 0.2 mm, and this displacement is too large to obtain sufficiently fine adjustment of the head.

SUMMARY OF THE INVENTION

It is accordingly an object of the invention to provide a head adjustment mechanism, which enables fine adjustment of the head.

According to the invention, a screw having two male thread sections cut in the same direction but at different pitches is used as the adjustment screw, and the difference between the two different pitches is made use of for obtaining fine displacements, thus permitting fine adjustment of the head.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF ONE PREFERRED EMBODIMENT

Figure 1:
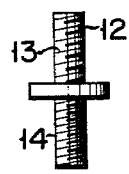
FIG. 1 is a front view of an adjustment screw of a head adjustment mechanism according to the invention.
Figure 2:
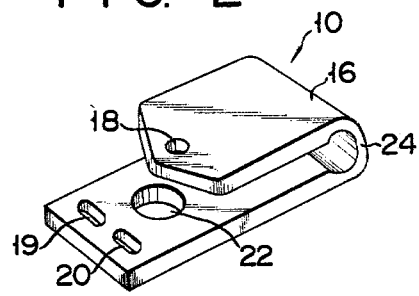
FIG. 2 is a perspective view of a head mount of the adjustment mechanism according to the invention.
Figure 3:
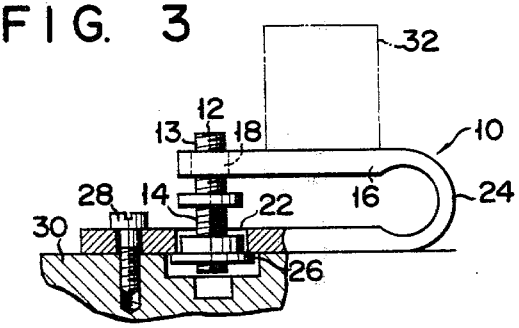
FIGS. 3 and 4 are respectively a partially broken front view and a top plan view showing the head adjustment mechanism according to the invention.
Figure 4:
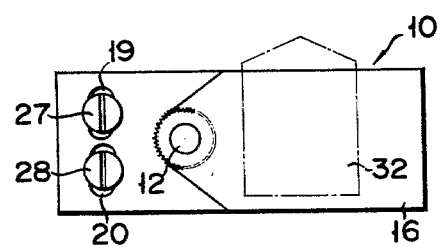
Figure 5:
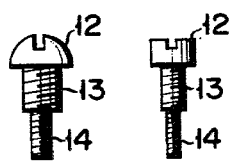
FIG. 5 is a front view showing modifications of the adjustment screw.

Referring now to FIGS. 1 and 2, a head adjustment mechanism 10 according to the invention has an adjustment screw 12 as shown in FIG. 1, which has two male thread sections 13 and 14 cut in the same direction but at different pitches. A head mount 16, as shown in FIG. 2, comprises a plate member having a substantially U-shaped sectional profile and has parallel upper and lower portions. The upper portion of the head mount 16, which functions as a head support portion, is formed with a threaded hole 18, and the lower portion is formed with two through holes 19 and 20 and a further through hole 22 which is aligned to the threaded hole 18. The head mount 16 also has a hinge portion 24 between the upper and lower portions, and this hinge portion preferably has a reduced thickness to provide for a spring effect. With the spring effect, that is, a spring force in the height direction, provided by the reduced thickness hinge portion 24 of the head mount 16, not only the adjustment of the position of the head mount 16 in the height direction is facilitated, but also it is possible to dispense with compression coil springs that are hitherto employed. As shown in FIG. 3, the adjustment screw 12 is inserted through the through hole 22 of the head mount 16, and its male thread portion 13 is screwed into the threaded hole 18. A nut 26 with a flange is screwed on the threaded portion 14. The head mount 16 is given a spring force by turning the adjustment screw 12 until the flange of the nut 26 is brought into contact with the head mount. The length and shape of the head mount are set such that the upper and lower portions thereof extend substantially parallel with each other in their spring-biased positions. Afterwards, the head mount 16 is mounted on a base member 30 at a predetermined position thereof by passing positioning screws 27 and 28 through the through holes 19 and 20 in the head mount and screwing them into respective threaded holes formed in the base member 30. The through holes 19 and 20 are desirably elongated holes or slots to permit fine adjustment of the head mount 16 in the lateral direction. As an example, the two male thread portions 13 and 14 of the adjustment screw 12 have respective pitches of 0.35 and 0.3. In this case, since the upper portion of the head mount 16 can be displaced relative to the top surface of the base member 16 while the lower portion is secured by the positioning screws 27 and 28 to the base member, one rotation of the adjustment screw 12 causes a vertial displacement of the upper portion by 0.05 mm relative to the base member, and in this way very accurate and ready adjustment of the head 32 on the head mount can be obtained. The direction of the vertical displacement of the head is related to the direction of the thread and rotation of the adjustment screw, and the extent of the displacement is related to the difference between the pitches of the two threaded sections of the screw and also to the number of rotations of the screw. As the adjustment screw 12 may be used any screw as long as such screw has two threaded sections of different pitches. For example, it may be a slotted round head screw or a slotted cylinder head screw as shown in FIG. 5.

Figure 6:
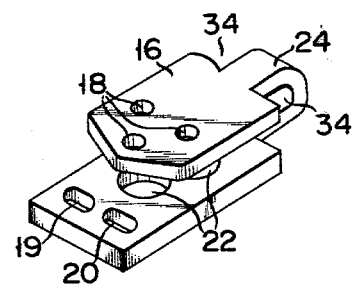
FIG. 6 is a perspective view showing a modification of the head mount.

Further, a more complicated adjustment of the head inclusive of an adjustment in the lateral direction of the head can be readily obtained with an arrangement as shown in FIG. 6, with three threaded holes 18 each formed at each apex of a triangle. Here, three adjustment screws 12 are so screwed in the threaded holes that the upper portion of the head mount 16 is inclined to become not parallel to the base member 30, thus inclining the head 32 mounted on it. The hinge portion 24 is preferably provided with a pair of notches 34 to facilitate the lateral inclination of the upper portion of the head mount 16.

As mentioned above, the screw 12 having two threaded sections cut in the same direction but at different pitches has its upper end portion put in screw engagement with the hole 18 of the upper portion of the head mount 16 and its lower end portion put in screw engagement with the base member 30. Thus, when the screw 12 is turned, the upper portion of the head mount 16 is moved up or down for a distance corresponding to the difference between the pitches of the screw 12, whereby the position of the head 32 is adjusted minutely. Further, with a head mount, which is formed by bending a plate member and has a hinge portion of a reduced thickness so that it can provide a spring effect, no spring member such as a compression coil spring is needed, so that it is possible to reduce the number of component parts and simplify the construction.

What is claimed is:

1. A head adjustment mechanism comprising:
 a head mount (16) having at least an upper portion for supporting a head and a lower portion secured to a base member, said upper and lower portions being biased in opposite directions;
 an unthreaded through hole (22) formed in one of the upper and lower portions of the head mount;
 a threaded hole (18) formed in the other of the upper and lower portions of the head mount and in substantial alignment with said through hole (22);
 at least one adjustment screw (12) having two oppositely extending male threaded sections (13, 14) cut in the same direction but at different pitches, one of said male threaded sections of said adjustment screw (12) being threadably engaged with said threaded hole (18) and the other of said male threaded sections extending through said through hole (22) in an unthreaded state with respect to said through hole, said through hole (22) being larger than the outer diameter of said other male threaded section; and
 a nut (26) above the portion of the head mount in which said through hole (22) is formed, said nut (26) being in screw engagement with said other male threaded section.

2. The head adjustment mechanism of claim 1, wherein said head mount comprises a bent plate having a substantially U-shaped sectional profile in which the upper and lower portions of the head mount on the legs of the U-shape, and having a hinge portion (24) which interconnects the upper and lower portions and which is thinner than the upper and lower portions to provide a spring effect to spring bias the upper and lower portions in said opposite directions, said upper and lower portions being substantially parallel to each other.

3. The head adjustment mechanism of claim 1 or 2, wherein said through hole (22) is formed on the lower portion of said head mount, and a threaded hole (18) is formed on the upper portion of said head mount, said nut (26) extending from the side of said lower portion most remote from said upper portion.

4. The head adjustment mechanism of claim 1 or 2, which comprises three of said through holes, three of said threaded holes each in substantial alignment with a respective through hole, and three of said adjustment screws extending in such a manner that their axes coincide with apices of a triangle.

5. The head adjustment mechanism of claim 4, wherein said through holes are each formed on the lower portion of said head mount, and said threaded holes are each formed on the upper portion of said head mount, and further comprising three of said nuts extending from the side of said lower portion most remote from said upper portion, said nuts each being associated with a respective through hole and threaded hole.

* * * * *